US010208255B2

(12) United States Patent
Lin et al.

(10) Patent No.: US 10,208,255 B2
(45) Date of Patent: Feb. 19, 2019

(54) METHOD FOR PRODUCING LIGHT OIL THROUGH LIQUEFYING BIOMASS

(71) Applicant: Beijing Huashi United Energy Technology and Development Co., Ltd, Beijing (CN)

(72) Inventors: Ke Lin, Beijing (CN); Lin Li, Beijing (CN); Lixin Guo, Beijing (CN); Yongjun Cui, Beijing (CN); Lilong Jiang, Beijing (CN)

(73) Assignee: Beijin Huashi United Energy Technology and Development, Beijing (CN)

(*) Notice: Subject to any disclaimer, the term of this patent is extended or adjusted under 35 U.S.C. 154(b) by 0 days.

(21) Appl. No.: 15/818,336

(22) Filed: Nov. 20, 2017

(65) Prior Publication Data
US 2018/0142161 A1 May 24, 2018

(30) Foreign Application Priority Data

Nov. 21, 2016 (CN) .......................... 2016 1 1041444

(51) Int. Cl.
C10G 1/06 (2006.01)
C10G 1/00 (2006.01)
(Continued)

(52) U.S. Cl.
CPC ............ C10G 1/065 (2013.01); C10G 1/002 (2013.01); C10G 7/00 (2013.01); C10G 45/00 (2013.01);
(Continued)

(58) Field of Classification Search
CPC ... C10G 1/06; C10G 1/00; C10G 7/00; C10G 45/00
See application file for complete search history.

(56) References Cited

U.S. PATENT DOCUMENTS 8,623,102 B2 * 1/2014 Quignard ................. C10G 1/08
44/307
2011/0167713 A1 7/2011 Quignard et al.
2014/0275299 A1 * 9/2014 Bedwell .................... C07C 1/12
518/704

FOREIGN PATENT DOCUMENTS

CN 1307926 8/2001
CN 201351763 11/2009
(Continued)

Primary Examiner — Youngsul Jeong
(74) Attorney, Agent, or Firm — Nicholas J. Landau; Bradley Arant Boult Cummings LLP

(57) ABSTRACT

The present invention discloses a method for producing light oil through liquefying biomass. The method comprises the following steps: (1) mixing a biomass, a hydrogenation catalyst and a solvent oil to prepare a biomass slurry; (2) carrying out a first liquefaction reaction with the biomass slurry and hydrogen gas to obtain a first reaction product; (3) carrying out a second liquefaction reaction with the first reaction product and hydrogen gas to obtain a second reaction product; (4) subjecting the second reaction product to a first separation operation to produce a light component and a heavy component; (5) carrying out vacuum distillation on the heavy component to obtain a light fraction; (6) mixing the light component with the light fraction to form a mixture, carrying out a hydrogenation reaction on the mixture to obtain a hydrogenation product; and (7) subjecting the hydrogenation product to fractionation operation to obtain a light oil. The two steps of liquefaction on the biomass, followed by separation, vacuum distillation and hydrogenation reaction enable the yield of the light oil to be increased.

18 Claims, 1 Drawing Sheet

(51) Int. Cl.
*C10G 7/00* (2006.01)
*C10G 45/00* (2006.01)

(52) U.S. Cl.
CPC . *C10G 2300/1014* (2013.01); *C10G 2300/42* (2013.01); *C10G 2300/44* (2013.01)

(56) References Cited

FOREIGN PATENT DOCUMENTS

| | | |
|---|---|---|
| CN | 102127462 | 7/2011 |
| CN | 102310005 | 1/2012 |
| CN | 103242871 | 8/2013 |
| CN | 204051658 | 12/2014 |
| CN | 104388117 | 3/2015 |
| CN | 104588079 | 5/2015 |
| CN | 204752627 | 11/2015 |

* cited by examiner

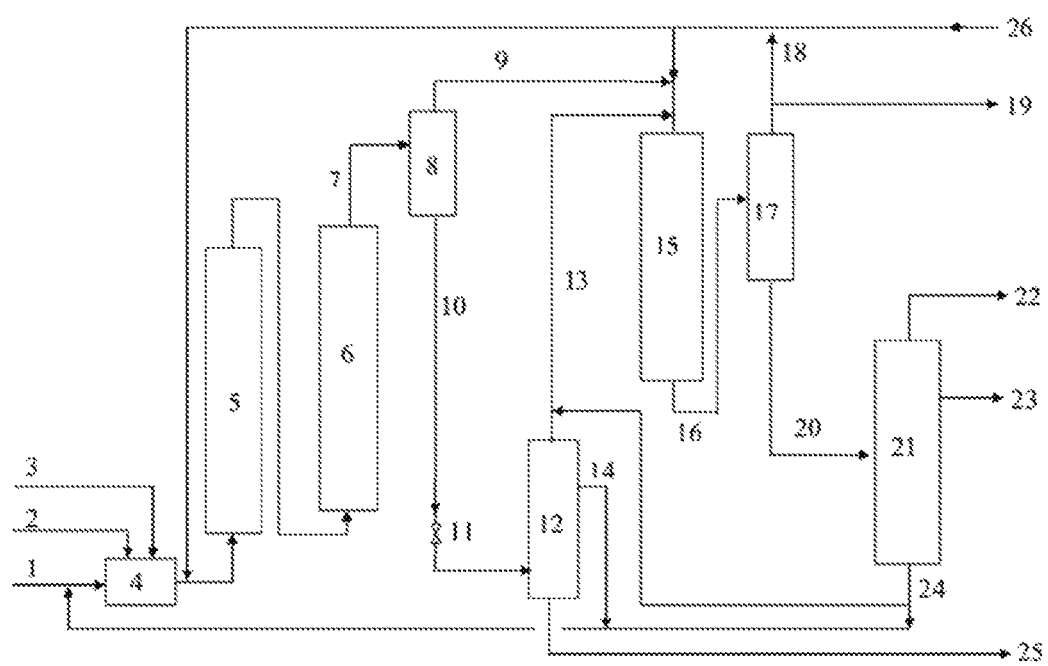

METHOD FOR PRODUCING LIGHT OIL THROUGH LIQUEFYING BIOMASS

CROSS REFERENCE TO RELATED APPLICATIONS

This application cites the priority of Chinese Patent Application No. 201611041444.5 filed on 21 Nov. 2016 (pending). The contents of the foregoing application is incorporated by references in its entirety, although the prosecution history of the foregoing application is not incorporated by reference.

TECHNICAL FIELD

The present invention belongs to the technical field of biomass liquefaction, and particularly relates to a method for producing light oil through liquefying biomass.

BACKGROUND

In a broad sense, biomass comprises all plants and microbes, as well as animals employing the plants and microbes as food and wastes produced by the animals; and in a narrow sense, the biomass mainly means substances such as lignocellulose (lignin for short) such as stalks and trees except for grains and fruits in a farming and forestry production process, leftovers of the agricultural product processing industry, farming and forestry wastes, livestock and poultry feces and wastes of an animal husbandry production process. Common representative biomass comprises crops, crop wastes, timber, timber wastes, animal feces, etc. The biomass becomes an important component of renewable energy sources due to the characteristics of renewability, low pollution and widespread distributivity, so that how to efficiently develop and utilize biomass energy plays very positive roles in solving problems on the energy sources and ecological environment.

At present, modes for developing and utilizing the biomass energy are mainly manifested in the following several aspects: (1) direct combustion: the biomass is directly burnt to use heat or further generate electricity; (2) a physical-chemical process: the biomass is subjected to physical-chemical treatment, followed by compression-forming, to obtain a formed fuel; (3) a biochemical process: the biomass is hydrolyzed and fermented to obtain ethanol or is subjected to a biogas technology to obtain a biogas; and (4) a thermochemical process: the biomass is gasified to obtain a biomass fuel gas, or is pyrolyzed to obtain charcoal or a crude biomass oil, or is directly liquefied to obtain a liquefied oil, etc. wherein, during the direct liquefaction of the biomass to obtain the liquefied oil, the biomass directly reacts with hydrogen generally under the conditions of a high pressure and a catalyst and is converted into a liquid fuel.

For example, a method for direct hydroliquefaction of biomass, which comprises two boiling-bed hydro-conversion steps, is disclosed by a Chinese Patent Document CN 102127462 A. The method comprises the following steps: a) preparing a suspension of biomass particles in a solvent, preferably a hydrogen donating solvent; b) subjecting the suspension to first hydro-conversion in the presence of hydrogen in at least one reactor which contains a boiling-bed catalyst and performs operation under the conditions of a temperature of 300 DEG C. to 440 DEG C., a total pressure of 15 MPa to 25 MPa, a hourly mass velocity of 0.1/h to 5/h and a hydrogen/feed ratio of 0.1 $Nm^3/kg$ to 2 $Nm^3/kg$; and c) subjecting at least part of an effluent obtained in the step b) to second hydro-conversion in the presence of hydrogen in at least one reactor which contains a boiling-bed-form catalyst and performs operation under the conditions of a temperature of 350 DEG C. to 470 DEG C., a total pressure of 15 MPa to 25 MPa, a hourly mass velocity of 0.1/h to 5/h and a hydrogen/feed ratio of 0.1 $Nm^3/kg$ to 2 $Nm^3/kg$. In the above-mentioned technology, a biomass feedstock is directly liquefied into a liquid substance through the first hydro-conversion step and the second hydro-conversion step.

In the above-mentioned technology, the liquid substance is separated to obtain a gas phase, an aqueous phase, as well as a light fraction comprising at least one selected from a group consisting of naphtha, kerosene and/or diesel liquid hydrocarbons, a vacuum gas oil heavy hydrocarbon fraction, a vacuum residue fraction and a solid fraction capable of being in a vacuum residue. The light fraction can be mingled with the vacuum gas oil heavy hydrocarbon fraction and the vacuum residue fraction during separation, and thus, the yield of the light fraction is lowered; and heavy fractions can be mingled with the light fraction during separation, and thus, the yield of the light fraction is also affected.

SUMMARY

Therefore, the present invention is to overcome the defect that the yield of light oil prepared through directly liquefying biomass is low, and provides a method for producing light oil through liquefying biomass, which has a high light oil yield.

In order to solve the problem described above, a technical solution of the present invention is as follows.

The method for producing light oil through liquefying biomass, provided by the present invention, comprises the following steps:
(1) mixing a biomass, a hydrogenation catalyst and a solvent oil to prepare a biomass slurry;
(2) carrying out a first liquefaction reaction with the biomass slurry and hydrogen gas to obtain a first reaction product;
(3) carrying out a second liquefaction reaction with the first reaction product and hydrogen gas to obtain a second reaction product;
(4) subjecting the second reaction product to a first separation operation to produce a light component and a heavy component;
(5) carrying out vacuum distillation on the heavy component to obtain a light fraction;
(6) mixing the light component with the light fraction to form a mixture, carrying out a hydrogenation reaction on the mixture to obtain a hydrogenation product; and
(7) subjecting the hydrogenation product to fractionation operation to obtain a light oil.

Preferably, in the step (1), a mass ratio of the biomass to the hydrogenation catalyst is 100: (0.5 to 5).

Preferably, in the step (2), reaction conditions for the first liquefaction reaction are as follows:
a reaction temperature is 280 DEG C. to 470 DEG C.;
a reaction pressure is 13 MPa to 27 MPa;
a gas-liquid ratio is 600 L/kg to 1,400 L/kg; and
a space velocity of the biomass slurry is 0.3/h to 2/h.

Further, in the step (2), reaction conditions for the first liquefaction reaction are as follows:
a reaction temperature is 450 DEG C. to 470 DEG C.;
a reaction pressure is 26 MPa to 27 MPa;
a gas-liquid ratio is 600 L/kg to 1,400 L/kg; and a space velocity of the biomass slurry is 0.3/h to 2/h.

Preferably, in the step (3), reaction conditions for the second liquefaction reaction are as follows:
a reaction temperature is 300 DEG C. to 490 DEG C.;
a reaction pressure is 12 MPa to 27 MPa;
a gas-liquid ratio is 700 L/kg to 1,600 L/kg; and
a space velocity of the biomass slurry is 0.3/h to 2/h.

Further, in the step (3), reaction conditions for the second liquefaction reaction are as follows:
a reaction temperature is 480 DEG C. to 490 DEG C.;
a reaction pressure is 26 MPa to 27 MPa;
a gas-liquid ratio is 700 L/kg to 1,600 L/kg; and
a space velocity of the biomass slurry is 0.3/h to 2/h.

Preferably, in the step (5), the vacuum distillation is carried out at a temperature of 320 DEG C. to 400 DEG C. under a pressure of 5 kPa to 20 kPa, wherein the pressure is an absolute pressure.

Preferably, in the step (6), reaction conditions for the hydrogenation reaction are as follows:
a reaction temperature is 280 DEG C. to 440 DEG C.;
a reaction pressure is 10 MPa to 25 MPa;
a hydrogen/oil volume ratio is 800 to 1,500; and
a space velocity is 0.5/h to 2/h.

Preferably, in the step (7), the fractionation operation is carried out at a temperature of 340 DEG C. to 390 DEG C.

Preferably, the method further comprises a step of collecting a distillate oil obtained after the vacuum distillation step and a heavy fraction obtained after the fractionation operation step to use the distillate oil and the heavy fraction as the solvent oil.

Preferably, before the hydrogenation product is subjected to fractionation operation, the hydrogenation product is subjected to a second separation operation to obtain hydrogen gas, a gas-phase light hydrocarbon and a liquid phase, wherein the hydrogen gas is circulated and used in the first liquefaction reaction, the second liquefaction reaction and the hydrogenation reaction.

Preferably, in the step (1), the biomass slurry has a biomass content of 10 wt % to 50 wt % and a particle size of 5 to 2,000 microns; and
the mixing is carried out at a temperature of 25 DEG C. to 180 DEG C.

Preferably, the hydrogenation catalyst comprises at least one selected from a group consisting of the following catalysts:
1) amorphous iron oxide and/or amorphous iron oxide hydroxide; and
2) amorphous aluminum oxide loading an active component, wherein the active component comprises at least one selected from oxides of metals of group VIB, group VIIB and group VIII, and the active component has a content of 10 wt % to 25 wt % with respect to the mass of the hydrogenation catalyst.

The solvent oil comprises at least one selected from a group consisting of the distillate oil obtained after the vacuum distillation step, vegetable oil, animal oil, coal tar and discharged slurry oil of a catalytic cracking unit.

The biomass is a material obtained from plants and microbes, as well as animals employing the plants and microbes as food and wastes produced by the animals through drying and crushing.

Compared with the prior art, the method for producing the light oil through liquefying the biomass, provided by the present invention, has the following beneficial effects:
1) according to the method for producing the light oil through liquefying the biomass, provided by embodiments of the present invention, a biomass, a hydrogenation catalyst and a solvent oil are mixed to prepare a biomass slurry; then, the biomass slurry and hydrogen gas are subjected to a first liquefaction reaction, and a second liquefaction reaction is carried out to obtain a second reaction product, so that the biomass can be fully liquefied into a liquid phase through two times of liquefaction reactions, and the yield of a liquid oil is increased; then, the second reaction product is subjected to a separation operation to produce a light component and a heavy component; then, vacuum distillation is carried out on the heavy component to obtain a light fraction; then, the light component is mixed with the light fraction to form a mixture, and a hydrogenation reaction is carried out on the mixture to obtain a hydrogenation product; the separation of the light component from the heavy component is achieved through the three continuous steps, i.e., the separation operation, the vacuum distillation and the hydrogenation reaction; the light fraction mingled with the heavy component is separated out through vacuum distillation, and meanwhile, the heavy fraction which is not prone to hydroliquefaction is separated out to avoid the influence on follow-up conversion of the light oil; then, the light fraction is mixed with the light component to form the mixture, and the hydrogenation reaction is carried out on the mixture, so that a few of heavy components, which are prone to light fraction conversion, mingled with the light component can be converted into light components through the hydrogenation reaction, and the yield of light oil is increased, particularly, the yield of a low-fractionation-range oil in the light oil such as naphtha; furthermore, biomass oil is subjected to separation and vacuum distillation in advance to enrich and agglomerate residues in the biomass oil as much as possible; then, the residues are removed from the bottom of a vacuum distillation device, so that the content of the residues in the follow-up light oil is lowered; and finally, the hydrogenation product is subjected to fractionation operation to obtain oils of all fractionation ranges. Proven by testing, the liquefied ratio of the biomass reaches 95 wt % or more, wherein the content of the biomass oil with a fractionation range of 145 DEG C. or below is 30 wt % to 40 wt %, the content of the biomass oil with a fractionation range from 145 DEG C. to 360 DEG C. is 30 wt % to 50 wt %, the content of the biomass oil with a fractionation range from 360 DEG C. to 520 DEG C. is 10 wt % to 15 wt %, the balance consists of a heavy oil with a fractionation range of 520 DEG C. or above and residues, and the content of the residues is not higher than 5 wt %;

2) the method for producing the light oil through liquefying the biomass, provided by embodiments of the present invention, further comprises a step of collecting a distillate oil obtained after the vacuum distillation step and a heavy fraction obtained after the fractionation operation step to use the distillate oil and the heavy fraction as the solvent oil; and by the step, the cost of the solvent oil can be effectively reduced, the source of the solvent oil is extended and is not limited to a mode of additionally adding a solvent oil such as a heavy oil, and thus, the solvent oil is flexible in supplying and high in operating flexibility; and 3) according to the method for producing the light oil through liquefying the biomass, provided by embodiments of the present invention, before the hydrogenation product is subjected to fractionation operation, the hydrogenation product is further subjected to a second separation operation to obtain hydrogen gas, a gas-phase light hydrocarbon and a liquid phase, wherein the hydrogen gas can be circulated and used in the first liquefaction reaction, the second liquefaction reaction and the hydrogenation reaction.

BRIEF DESCRIPTION OF THE DRAWINGS

In order to illustrate the technical solutions in the embodiments of the present invention or in the prior art more clearly, a brief description to the accompanying drawings which are needed in the description of the embodiments or the prior art is given below. Apparently, the accompanying drawings in the description below are merely some of the embodiments of the present invention, based on which other drawings may be obtained by those of ordinary skill in the art without any creative effort.

The FIGURE is a schematic flow diagram of a method for producing light oil through liquefying biomass provided by the present invention.

REFERENCE SIGNS

1—solvent oil; 2—biomass; 3—hydrogenation catalyst; 4—biomass slurry tank; 5—suspended-bed reactor; 6—internal-circulation suspended-bed reactor; 7—suspended-bed hydrogenation product; 8—thermal high-pressure separator; 9—light component; 10—heavy component; 11—high-pressure-difference relief valve; 12—vacuum distillation tower; 13—tower top oil; 14—survey-line distillate oil; 15—fixed-bed hydrogenation reactor; 16—fixed-bed hydrogenation product; 17—separator; 18—hydrogen gas; 19—gas-phase light hydrocarbon; 20—distillate oil; 21—fractionating tower; 22—biomass naphtha; 23—biomass diesel; 24—biomass tower bottom oil; 25—residue; and 26—hydrogen gas.

DETAILED DESCRIPTION

To make the objectives, technical solutions and advantages of the present invention clearer, the following further describes the present invention in conjunction with embodiments. It should be understood that the present invention can be implemented in various forms, but not intent to be limited to the described embodiments. On the contrary, these embodiments are provided so that the present invention will be thorough and complete, and conceptions of the present invention will be fully conveyed to those skilled in the art. The present invention will be only limited by the appended claims.

In addition, technical features involved in different embodiments of the present invention described below can be mutually combined as long as they do not conflict with each other.

In each of the following embodiments and comparative examples, calculation formulas for a liquefaction ratio of biomass and a content of biomass oil of each fractionation range in distillate oil are as follows:

liquefaction ratio of biomass=(total liquid mass of product−mass of hydrogenation catalyst−mass of solvent oil)/total mass of biomass;

content of biomass oil of each fractionation range in distillate oil=(mass of oil of each fractionation range−mass of solvent oil of the fractionation range)/total mass of biomass oil; and content of residue in distillate oil=mass of residue/total mass of all oils.

Embodiment 1

This embodiment provides a method for producing light oil through liquefying biomass, as shown in the FIGURE, comprising the following steps:

(1) uniformly mixing amorphous aluminum oxide (having a particle size of 5 to 50 microns and a loading amount of 10 wt %) loading an Mo oxide and an Ni oxide, wheat straw particles with a particle size of 10 microns and sulfur in a biomass slurry tank 4 according to a mass ratio of 5:100:0.3 to obtain a mixture, adding the mixture into medium-/low-temperature coal tar, and carrying out uniform mixing at a temperature of 100 DEG C. to form a biomass slurry with a biomass content of 25 wt %;

(2) carrying out a first liquefaction reaction with the biomass slurry and additionally-added hydrogen gas 26 in a suspended-bed reactor 5 to obtain a first reaction product, wherein parameters for the first liquefaction reaction are as follows: a reaction temperature is 320 DEG C., a reaction pressure is 20 MPa, a gas-liquid ratio is 1,000 L/kg and a space velocity of the biomass slurry is 1/h;

(3) carrying out a second liquefaction reaction with the first reaction product and hydrogen gas in an internal-circulation suspended-bed reactor 6 to obtain a second reaction product, i.e., a suspended-bed hydrogenation product 7, wherein parameters for the second liquefaction reaction are as follows: a reaction temperature is 400 DEG C., a reaction pressure is 20 MPa, a gas-liquid ratio is 1,100 L/kg and a space velocity of the biomass slurry is 1/h;

(4) subjecting the second reaction product to a first separation operation in a thermal high-pressure separator 8 under a pressure of 19 MPa to produce a light component 9 and a heavy component 10;

(5) subjecting the heavy component 10 to depressurization operation by a high-pressure-difference relief valve 11, followed by allowing the depressurized heavy component to enter a vacuum distillation tower 12 and carrying out vacuum distillation at a temperature of 360 DEG C. under a pressure of 10 kPa to obtain a light fraction, i.e., a tower top oil 13 and a survey-line distillate oil 14 in the vacuum distillation tower 12, returning the survey-line distillate oil 14 to the step (1) as a solvent oil 1, and recycling residues 25 from the tower bottom of the vacuum distillation tower 12;

(6) mixing the light component 9 with the tower top oil 13 to form a mixture, and carrying out a hydrogenation reaction on the mixture in a fixed-bed hydrogenation reactor 15 to obtain a fixed-bed hydrogenation product 16, wherein conditions for the hydrogenation reaction are as follows: a reaction temperature is 360 DEG C., a reaction pressure is 17 MPa, a hydrogen-oil volume ratio is 1,100 and a space velocity is 1.2/h;

(7) allowing the fixed-bed hydrogenation product 16 to enter a separator 17, carrying out a second separation operation on the fixed-bed hydrogenation product 16 to obtain hydrogen gas 18, a gas-phase light hydrocarbon 19 and a liquid phase, i.e., a distillate oil 20, wherein the hydrogen gas 18 can be used in the first liquefaction reaction, the second liquefaction reaction and the hydrogenation reaction, and the gas-phase light hydrocarbon 19 is recycled; and (8) allowing the distillate oil 20 to enter a fractionating tower 21, carrying out fractionation operation at a temperature of 360 DEG C. to separate out naphtha from the top of the tower, to separate out diesel from the middle and upper part of the tower and discharge a tower bottom oil 24, i.e., a heavy fraction from the bottom of the tower, and returning the heavy fraction to the step (1) as the solvent oil 1.

Proven by testing, the liquefied ratio of the biomass reaches 98 wt %, wherein the content of the biomass oil with a fractionation range of 145 DEG C. or below is 40 wt %, the content of the biomass oil with a fractionation range from 145 DEG C. to 360 DEG C. is 45 wt %, the content of the biomass oil with a fractionation range from 360 DEG C. to 520 DEG C. is 10 wt %, the content of a heavy oil with a fractionation range of 520 DEG C. or above is 4 wt %, and the content of residues is 1 wt %.

Embodiment 2

This embodiment provides a method for producing light oil through liquefying biomass, comprising the following steps:

(1) uniformly mixing amorphous aluminum oxide (having a particle size of 100 to 150 microns and a loading amount of 25%) loading a W oxide and an Ni oxide, reed straw particles with a particle size of 200 microns and sulfur in a biomass slurry tank 4 according to a mass ratio of 1:100:0.4 to obtain a mixture, adding the mixture into soybean oil, and carrying out uniform mixing at a temperature of 180 DEG C. to form a biomass slurry with a biomass content of 10 wt %;

(2) carrying out a first liquefaction reaction with the biomass slurry and additionally-added hydrogen gas 26 in a suspended-bed reactor 5 to obtain a first reaction product, wherein parameters for the first liquefaction reaction are as follows: a reaction temperature is 280 DEG C., a reaction pressure is 27 MPa, a gas-liquid ratio is 600 L/kg and a space velocity of the biomass slurry is 2/h;

(3) carrying out a second liquefaction reaction with the first reaction product and hydrogen gas in an internal-circulation suspended-bed reactor 6 to obtain a second reaction product, i.e., a suspended-bed hydrogenation product 7, wherein parameters for the second liquefaction reaction are as follows: a reaction temperature is 490 DEG C., a reaction pressure is 12 MPa, a gas-liquid ratio is 1,600 L/kg and a space velocity of the biomass slurry is 0.3/h;

(4) subjecting the second reaction product to a first separation operation in a thermal high-pressure separator 8 under a pressure of 15 MPa to produce a light component 9 and a heavy component 10;

(5) subjecting the heavy component 10 to depressurization operation by a high-pressure-difference relief valve 11, followed by allowing the depressurized heavy component to enter a vacuum distillation tower 12 and carrying out vacuum distillation at a temperature of 400 DEG C. under a pressure of 5 kPa to obtain a light fraction, i.e., a tower top oil 13 and a survey-line distillate oil 14 in the vacuum distillation tower 12, returning the survey-line distillate oil 14 to the step (1) as a solvent oil 1, and recycling residues 25 from the tower bottom of the vacuum distillation tower 12;

(6) mixing the light component 9 with the tower top oil 13 to form a mixture, and carrying out a hydrogenation reaction on the mixture in a fixed-bed hydrogenation reactor 15 to obtain a fixed-bed hydrogenation product 16, wherein conditions for the hydrogenation reaction are as follows: a reaction temperature is 440 DEG C., a reaction pressure is 10 MPa, a hydrogen-oil volume ratio is 1,500 and a space velocity is 0.5/h;

(7) allowing the fixed-bed hydrogenation product 16 to enter a separator 17, carrying out a second separation operation on the fixed-bed hydrogenation product 16 to obtain hydrogen gas 18, a gas-phase light hydrocarbon 19 and a liquid phase, i.e., a distillate oil 20, wherein the hydrogen gas 18 can be used in the first liquefaction reaction, the second liquefaction reaction and the hydrogenation reaction, and the gas-phase light hydrocarbon 19 is recycled; and (8) allowing the distillate oil 20 to enter a fractionating tower 21, carrying out fractionation operation at a temperature of 360 DEG C. to separate out naphtha from the top of the tower, to separate out diesel from the middle and upper part of the tower and discharge a tower bottom oil 24, i.e., a heavy fraction from the bottom of the tower, and returning the heavy fraction to the step (1) as the solvent oil 1.

Proven by testing, the liquefied ratio of the biomass reaches 96 wt %, wherein the content of the biomass oil with a fractionation range of 145 DEG C. or below is 35 wt %, the content of the biomass oil with a fractionation range from 145 DEG C. to 360 DEG C. is 40 wt %, the content of the biomass oil with a fractionation range from 360 DEG C. to 520 DEG C. is 15 wt %, the content of a heavy oil with a fractionation range of 520 DEG C. or above is 6 wt %, and the content of residues is 4 wt %.

Embodiment 3

This embodiment provides a method for producing light oil through liquefying biomass, comprising the following steps:

(1) uniformly mixing amorphous aluminum oxide (having a particle size of 100 to 150 microns and a loading amount of 10%) loading a Pd oxide and an Ni oxide, amorphous iron oxide, reed straw particles with a particle size of 1,000 microns and sulfur in a biomass slurry tank 4 according to a mass ratio of 2:2:100:0.3 to obtain a mixture, adding the mixture into soybean oil, and carrying out uniform mixing at a temperature of 25 DEG C. to form a biomass slurry with a biomass content of 50 wt %;

(2) carrying out a first liquefaction reaction with the biomass slurry and additionally-added hydrogen gas 26 in a suspended-bed reactor 5 to obtain a first reaction product, wherein parameters for the first liquefaction reaction are as follows: a reaction temperature is 470 DEG C., a reaction pressure is 13 MPa, a gas-liquid ratio is 1,400 L/kg and a space velocity of the biomass slurry is 0.3/h;

(3) carrying out a second liquefaction reaction with the first reaction product and hydrogen gas in an internal-circulation suspended-bed reactor 6 to obtain a second reaction product, i.e., a suspended-bed hydrogenation product 7, wherein parameters for the second liquefaction reaction are as follows: a reaction temperature is 300 DEG C., a reaction pressure is 27 MPa, a gas-liquid ratio is 700 L/kg and a space velocity of the biomass slurry is 2/h;

(4) subjecting the second reaction product to a first separation operation in a thermal high-pressure separator 8 under a pressure of 15 MPa to produce a light component 9 and a heavy component 10;
(5) subjecting the heavy component 10 to depressurization operation by a high-pressure-difference relief valve 11, followed by allowing the depressurized heavy component to enter a vacuum distillation tower 12 and carrying out vacuum distillation at a temperature of 320 DEG C. under a pressure of 20 kPa to obtain a light fraction, i.e., a tower top oil 13 and a survey-line distillate oil 14 in the vacuum distillation tower 12, returning the survey-line distillate oil 14 to the step (1) as a solvent oil 1, and recycling residues 25 from the tower bottom of the vacuum distillation tower 12;
(6) mixing the light component 9 with the tower top oil 13 to form a mixture, and carrying out a hydrogenation reaction on the mixture in a fixed-bed hydrogenation reactor 15 to obtain a fixed-bed hydrogenation product 16, wherein conditions for the hydrogenation reaction are as follows: a reaction temperature is 280 DEG C., a reaction pressure is 25 MPa, a hydrogen-oil volume ratio is 800 and a space velocity is 2/h;
(7) allowing the fixed-bed hydrogenation product 16 to enter a separator 17, carrying out a second separation operation on the fixed-bed hydrogenation product 16 to obtain hydrogen gas 18, a gas-phase light hydrocarbon 19 and a liquid phase, i.e., a distillate oil 20, wherein the hydrogen gas 18 can be used in the first liquefaction reaction, the second liquefaction reaction and the hydrogenation reaction, and the gas-phase light hydrocarbon 19 is recycled; and
(8) allowing the distillate oil 20 to enter a fractionating tower 21, carrying out fractionation operation at a temperature of 300 DEG C. to separate out naphtha from the top of the tower, to separate out diesel from the middle and upper part of the tower and discharge a tower bottom oil 24, i.e., a heavy fraction from the bottom of the tower, and returning the heavy fraction to the step (1) as the solvent oil 1.

Proven by testing, the liquefied ratio of the biomass reaches 97 wt %, wherein the content of the biomass oil with a fractionation range of 145 DEG C. or below is 36 wt %, the content of the biomass oil with a fractionation range from 145 DEG C. to 360 DEG C. is 42 wt %, the content of the biomass oil with a fractionation range from 360 DEG C. to 520 DEG C. is 14 wt %, the content of a heavy oil with a fractionation range of 520 DEG C. or above is 6 wt %, and the content of residues is 2 wt %.

Embodiment 4

This embodiment provides a method for producing light oil through liquefying biomass, comprising the following steps:
(1) uniformly mixing amorphous aluminum oxide (having a particle size of 150 to 200 microns and a loading amount of 13%) loading an Mo oxide and a Co oxide, wood-shaving particles with a particle size of 2,000 microns and sulfur in a biomass slurry tank 4 according to a mass ratio of 3:100:0.2 to obtain a mixture, adding the mixture into low-temperature animal oil, and carrying out uniform mixing at a temperature of 80 DEG C. to form a biomass slurry with a biomass content of 20 wt %;
(2) carrying out a first liquefaction reaction with the biomass slurry and additionally-added hydrogen gas 26 in a suspended-bed reactor 5 to obtain a first reaction product, wherein parameters for the first liquefaction reaction are as follows: a reaction temperature is 320 DEG C., a reaction pressure is 18 MPa, a gas-liquid ratio is 800 L/kg and a space velocity of the biomass slurry is 1.5/h;
(3) carrying out a second liquefaction reaction with the first reaction product and hydrogen gas in an internal-circulation suspended-bed reactor 6 to obtain a second reaction product, i.e., a suspended-bed hydrogenation product 7, wherein parameters for the second liquefaction reaction are as follows: a reaction temperature is 350 DEG C., a reaction pressure is 18 MPa, a gas-liquid ratio is 1,200 L/kg and a space velocity of the biomass slurry is 1.5/h;
(4) subjecting the second reaction product to a first separation operation in a thermal high-pressure separator 8 under a pressure of 22 MPa to produce a light component 9 and a heavy component 10;
(5) subjecting the heavy component 10 to depressurization operation by a high-pressure-difference relief valve 11, followed by allowing the depressurized heavy component to enter a vacuum distillation tower 12 and carrying out vacuum distillation at a temperature of 380 DEG C. under a pressure of 8 kPa to obtain a light fraction, i.e., a tower top oil 13 and a survey-line distillate oil 14 in the vacuum distillation tower 12, and recycling residues 25 from the tower bottom of the vacuum distillation tower 12;
(6) mixing the light component 9 with the tower top oil 13 to form a mixture, and carrying out a hydrogenation reaction on the mixture in a fixed-bed hydrogenation reactor 15 to obtain a fixed-bed hydrogenation product 16, wherein conditions for the hydrogenation reaction are as follows: a reaction temperature is 400 DEG C., a reaction pressure is 18 MPa, a hydrogen-oil volume ratio is 1,100 and a space velocity is 1.3/h;
(7) allowing the fixed-bed hydrogenation product 16 to enter a separator 17, carrying out a second separation operation on the fixed-bed hydrogenation product 16 to obtain hydrogen gas 18, a gas-phase light hydrocarbon 19 and a liquid phase, i.e., a distillate oil 20, wherein the hydrogen gas 18 can be used in the first liquefaction reaction, the second liquefaction reaction and the hydrogenation reaction, and the gas-phase light hydrocarbon 19 is recycled; and
(8) allowing the distillate oil 20 to enter a fractionating tower 21, carrying out fractionation operation at a temperature of 330 DEG C. to separate out naphtha from the top of the tower, to separate out diesel from the middle and upper part of the tower and discharge a tower bottom oil 24, i.e., a heavy fraction from the bottom of the tower.

Proven by testing, the liquefied ratio of the biomass reaches 95 wt %, wherein the content of the biomass oil with a fractionation range of 145 DEG C. or below is 30 wt %, the content of the biomass oil with a fractionation range from 145 DEG C. to 360 DEG C. is 40 wt %, the content of the biomass oil with a fractionation range from 360 DEG C. to 520 DEG C. is 15 wt %, the content of a heavy oil with a fractionation range of 520 DEG C. or above is 10 wt %, and the content of residues is 5 wt %.

Embodiment 5

This embodiment provides a method for producing light oil through liquefying biomass, comprising the following steps:

(1) uniformly mixing amorphous aluminum oxide (having a particle size of 250 to 350 microns and a loading amount of 42 wt %) loading a W oxide and a Co oxide, amorphous iron oxide hydroxide, small wood-shaving particles with a particle size of 5 microns and sulfur in a biomass slurry tank 4 according to a mass ratio of 1:2:100:0.25 to obtain a mixture, adding the mixture into low-temperature vegetable oil, and carrying out uniform mixing at a temperature of 120 DEG C. to form a biomass slurry with a biomass content of 40 wt %;

(2) carrying out a first liquefaction reaction with the biomass slurry and additionally-added hydrogen gas 26 in a suspended-bed reactor 5 to obtain a first reaction product, wherein parameters for the first liquefaction reaction are as follows: a reaction temperature is 360 DEG C., a reaction pressure is 21 MPa, a gas-liquid ratio is 1,300 L/kg and a space velocity of the biomass slurry is 1.1/h;

(3) carrying out a second liquefaction reaction with the first reaction product and hydrogen gas in an internal-circulation suspended-bed reactor 6 to obtain a second reaction product, i.e., a suspended-bed hydrogenation product 7, wherein parameters for the second liquefaction reaction are as follows: a reaction temperature is 330 DEG C., a reaction pressure is 24 MPa, a gas-liquid ratio is 1,000 L/kg and a space velocity of the biomass slurry is 1.6/h;

(4) subjecting the second reaction product to a first separation operation in a thermal high-pressure separator 8 under a pressure of 21 MPa to produce a light component 9 and a heavy component 10;

(5) subjecting the heavy component 10 to depressurization operation by a high-pressure-difference relief valve 11, followed by allowing the depressurized heavy component to enter a vacuum distillation tower 12 and carrying out vacuum distillation at a temperature of 330 DEG C. under a pressure of 11 kPa to obtain a light fraction, i.e., a tower top oil 13 and a survey-line distillate oil 14 in the vacuum distillation tower 12, returning the survey-line distillate oil 14 to the step (1) as a solvent oil 1, and recycling residues 25 from the tower bottom of the vacuum distillation tower 12;

(6) mixing the light component 9 with the tower top oil 13 to form a mixture, and carrying out a hydrogenation reaction on the mixture in a fixed-bed hydrogenation reactor 15 to obtain a fixed-bed hydrogenation product 16, wherein conditions for the hydrogenation reaction are as follows: a reaction temperature is 360 DEG C., a reaction pressure is 20 MPa, a hydrogen-oil volume ratio is 1,000 and a space velocity is 1/h;

(7) allowing the fixed-bed hydrogenation product 16 to enter a separator 17, carrying out a second separation operation on the fixed-bed hydrogenation product 16 to obtain hydrogen gas 18, a gas-phase light hydrocarbon 19 and a liquid phase, i.e., a distillate oil 20, wherein the hydrogen gas 18 can be used in the first liquefaction reaction, the second liquefaction reaction and the hydrogenation reaction, and the gas-phase light hydrocarbon 19 is recycled; and (8) allowing the distillate oil 20 to enter a fractionating tower 21, carrying out fractionation operation at a temperature of 280 DEG C. to separate out naphtha from the top of the tower, to separate out diesel from the middle and upper part of the tower and discharge a tower bottom oil 24, i.e., a heavy fraction from the bottom of the tower, and returning the heavy fraction to the step (1) as the solvent oil 1.

Proven by testing, the liquefied ratio of the biomass reaches 96 wt %, wherein the content of the biomass oil with a fractionation range of 145 DEG C. or below is 33 wt %, the content of the biomass oil with a fractionation range from 145 DEG C. to 360 DEG C. is 43 wt %, the content of the biomass oil with a fractionation range from 360 DEG C. to 520 DEG C. is 15 wt %, the content of a heavy oil with a fractionation range of 520 DEG C. or above is 5 wt %, and the content of residues is 4 wt %.

Embodiment 6

This embodiment provides a method for producing light oil through liquefying biomass, comprising the following steps:

(1) uniformly mixing amorphous aluminum oxide (having a particle size of 350 to 500 microns and a loading amount of 40 wt %) loading an Mo oxide and an Ni oxide, amorphous iron oxide, wheat straw particles with a particle size of 10 microns and sulfur in a biomass slurry tank 4 according to a mass ratio of 1:1:100:0.1 to obtain a mixture, adding the mixture into medium-/low-temperature coal tar, and carrying out uniform mixing at a temperature of 100 DEG C. to form a biomass slurry with a biomass content of 40 wt %;

(2) carrying out a first liquefaction reaction with the biomass slurry and additionally-added hydrogen gas 26 in a suspended-bed reactor 5 to obtain a first reaction product, wherein parameters for the first liquefaction reaction are as follows: a reaction temperature is 300 DEG C., a reaction pressure is 21 MPa, a gas-liquid ratio is 1,000 L/kg and a space velocity of the biomass slurry is 1.1/h;

(3) carrying out a second liquefaction reaction with the first reaction product and hydrogen gas in an internal-circulation suspended-bed reactor 6 to obtain a second reaction product, i.e., a suspended-bed hydrogenation product 7, wherein parameters for the second liquefaction reaction are as follows: a reaction temperature is 330 DEG C., a reaction pressure is 24 MPa, a gas-liquid ratio is 1,000 L/kg and a space velocity of the biomass slurry is 2/h;

(4) subjecting the second reaction product to a first separation operation in a thermal high-pressure separator 8 under a pressure of 21 MPa to produce a light component 9 and a heavy component 10;

(5) subjecting the heavy component 10 to depressurization operation by a high-pressure-difference relief valve 11, followed by allowing the depressurized heavy component to enter a vacuum distillation tower 12 and carrying out vacuum distillation at a temperature of 330 DEG C. under a pressure of 11 kPa to obtain a light fraction, i.e., a tower top oil 13 and a survey-line distillate oil 14 in the vacuum distillation tower 12, returning the survey-line distillate oil 14 to the step (1) as a solvent oil 1, and recycling residues 25 from the tower bottom of the vacuum distillation tower 12;

(6) mixing the light component 9 with the tower top oil 13 to form a mixture, and carrying out a hydrogenation reaction on the mixture in a fixed-bed hydrogenation reactor 15 to obtain a fixed-bed hydrogenation product 16, wherein conditions for the hydrogenation reaction are as follows: a reaction temperature is 360 DEG C., a reaction pressure is 20 MPa, a hydrogen-oil volume ratio is 1,000 and a space velocity is 1/h; and (7) allowing the fixed-bed hydrogenation product 16 to enter a fractionating tower 21, carrying out fractionation operation at a temperature of 280 DEG C. to separate out naphtha from the top of the tower, to separate out diesel from the middle and upper part of the tower and discharge a tower bottom oil 24, i.e., a heavy fraction from the bottom of the tower, and returning the heavy fraction to the step (1) as the solvent oil 1.

Proven by testing, the liquefied ratio of the biomass reaches 96.5 wt %, wherein the content of the biomass oil with a fractionation range of 145 DEG C. or below is 34 wt %, the content of the biomass oil with a fractionation range from 145 DEG C. to 360 DEG C. is 42.5 wt %, the content of the biomass oil with a fractionation range from 360 DEG C. to 520 DEG C. is 15 wt %, the content of a heavy oil with a fractionation range of 520 DEG C. or above is 4.5 wt %, and the content of residues is 4 wt %.

Embodiment 7

This embodiment provides a method for producing light oil through liquefying biomass, comprising the following steps:

(1) uniformly mixing amorphous aluminum oxide (having a particle size of 100 to 150 microns and a loading amount of 25%) loading a W oxide and an Ni oxide, reed straw particles with a particle size of 200 microns and sulfur in a biomass slurry tank 4 according to a mass ratio of 1:100:0.4 to obtain a mixture, adding the mixture into soybean oil, and carrying out uniform mixing at a temperature of 180 DEG C. to form a biomass slurry with a biomass content of 10 wt %;

(2) carrying out a first liquefaction reaction with the biomass slurry and additionally-added hydrogen gas 26 in a suspended-bed reactor 5 to obtain a first reaction product, wherein parameters for the first liquefaction reaction are as follows: a reaction temperature is 450 DEG C., a reaction pressure is 26 MPa, a gas-liquid ratio is 600 L/kg and a space velocity of the biomass slurry is 2/h;

(3) carrying out a second liquefaction reaction with the first reaction product and hydrogen gas in an internal-circulation suspended-bed reactor 6 to obtain a second reaction product, i.e., a suspended-bed hydrogenation product 7, wherein parameters for the second liquefaction reaction are as follows: a reaction temperature is 480 DEG C., a reaction pressure is 26 MPa, a gas-liquid ratio is 1,600 L/kg and a space velocity of the biomass slurry is 0.3/h;

(4) subjecting the second reaction product to a first separation operation in a thermal high-pressure separator 8 under a pressure of 15 MPa to produce a light component 9 and a heavy component 10;

(5) subjecting the heavy component 10 to depressurization operation by a high-pressure-difference relief valve 11, followed by allowing the depressurized heavy component to enter a vacuum distillation tower 12 and carrying out vacuum distillation at a temperature of 400 DEG C. under a pressure of 5 kPa to obtain a light fraction, i.e., a tower top oil 13 and a survey-line distillate oil 14 in the vacuum distillation tower 12, returning the survey-line distillate oil 14 to the step (1) as a solvent oil 1, and recycling residues 25 from the tower bottom of the vacuum distillation tower 12;

(6) mixing the light component 9 with the tower top oil 13 to form a mixture, and carrying out a hydrogenation reaction on the mixture in a fixed-bed hydrogenation reactor 15 to obtain a fixed-bed hydrogenation product 16, wherein conditions for the hydrogenation reaction are as follows: a reaction temperature is 440 DEG C., a reaction pressure is 10 MPa, a hydrogen-oil volume ratio is 1,500 and a space velocity is 0.5/h;

(7) allowing the fixed-bed hydrogenation product 16 to enter a separator 17, carrying out a second separation operation on the fixed-bed hydrogenation product 16 to obtain hydrogen gas 18, a gas-phase light hydrocarbon 19 and a liquid phase, i.e., a distillate oil 20, wherein the hydrogen gas 18 can be used in the first liquefaction reaction, the second liquefaction reaction and the hydrogenation reaction, and the gas-phase light hydrocarbon 19 is recycled; and (8) allowing the distillate oil 20 to enter a fractionating tower 21, carrying out fractionation operation at a temperature of 390 DEG C. to separate out naphtha from the top of the tower, to separate out diesel from the middle and upper part of the tower and discharge a tower bottom oil 24, i.e., a heavy fraction from the bottom of the tower, and returning the heavy fraction to the step (1) as the solvent oil 1.

Proven by testing, the liquefied ratio of the biomass reaches 96.8 wt %, wherein the content of the biomass oil with a fractionation range of 145 DEG C. or below is 35.2 wt %, the content of the biomass oil with a fractionation range from 145 DEG C. to 360 DEG C. is 40.5 wt %, the content of the biomass oil with a fractionation range from 360 DEG C. to 520 DEG C. is 15 wt %, the content of a heavy oil with a fractionation range of 520 DEG C. or above is 5.3 wt %, and the content of residues is 4 wt %.

Comparative Example 1

This comparative example provides a method for producing light oil through liquefying biomass, comprising the following steps:

(1) uniformly mixing amorphous aluminum oxide (having a particle size of 5 to 50 microns and a loading amount of 10 wt %) loading an Mo oxide and an Ni oxide, wheat straw particles with a particle size of 10 microns and sulfur in a biomass slurry tank 4 according to a mass ratio of 5:100:0.3 to obtain a mixture, adding the mixture into medium-/low-temperature coal tar, and carrying out uniform mixing at a temperature of 100 DEG C. to form a biomass slurry with a biomass content of 25 wt %;

(2) carrying out a first liquefaction reaction with the biomass slurry and additionally-added hydrogen gas 26 in a suspended-bed reactor 5 to obtain a first reaction product, wherein parameters for the first liquefaction reaction are as follows: a reaction temperature is 320 DEG C., a reaction pressure is 20 MPa, a gas-liquid ratio is 1,000 L/kg and a space velocity of the biomass slurry is 1/h;

(3) carrying out a second liquefaction reaction with the first reaction product and hydrogen gas in an internal-circulation suspended-bed reactor 6 to obtain a second reaction product, i.e., a suspended-bed hydrogenation product 7, wherein parameters for the second liquefaction reaction are as follows: a reaction temperature is 400 DEG C., a reaction pressure is 20 MPa, a gas-liquid ratio is 1,100 L/kg and a space velocity of the biomass slurry is 1/h; and (4) subjecting the second reaction product to a first separation operation in a thermal high-pressure separator 8 under a pressure of 19 MPa to produce a light component 9 and a heavy component 10.

Proven by testing, the liquefied ratio of the biomass reaches 98 wt %, wherein the content of the biomass oil with a fractionation range of 145 DEG C. or below is 15 wt %, the content of the biomass oil with a fractionation range from 145 DEG C. to 360 DEG C. is 20 wt %, the content of the biomass oil with a fractionation range from 360 DEG C. to 520 DEG C. is 45 wt %, the content of a heavy oil with a fractionation range of 520 DEG C. or above is 12 wt %, and the content of residues is 8 wt %.

Apparently, the above-described embodiments are merely examples for the clarity of the description, but not intended to be limiting on the implementations of the present invention. For those of ordinary skill in the art, variations or changes in different forms can be made on the basis of the above description. All implementations should not and could not be exhaustive herein. Any derived obvious variations or changes still fall within the protection scope of the present invention.

The following is claimed:

1. A method for producing light oil through liquefying biomass, comprising the following steps:
    (1) mixing a biomass, a hydrogenation catalyst and a solvent oil to prepare a biomass slurry;
    (2) carrying out a first liquefaction reaction with the biomass slurry and hydrogen gas to obtain a first reaction product;
    (3) carrying out a second liquefaction reaction with the first reaction product and hydrogen gas to obtain a second reaction product;
    (4) subjecting the second reaction product to a first separation operation to produce a light component and a heavy component;
    (5) carrying out vacuum distillation on the heavy component to obtain a light fraction;
    (6) mixing the light component with the light fraction to form a mixture, carrying out a hydrogenation reaction on the mixture to obtain a hydrogenation product wherein reaction conditions for the hydrogenation reaction are as follows:
    a reaction temperature is 280° C. to 440° C.;
    a reaction pressure is 10 MPa to 25 MPa;
    a hydrogen/oil volume ratio is 800 to 1,500; and
    a space velocity is 0.5/h to 2/h; and
    (7) subjecting the hydrogenation product to fractionation operation to obtain a light oil.

2. The method according to claim 1, wherein in the step (1), a mass ratio of the biomass to the hydrogenation catalyst is 100:0.5 to 100:5.

3. The method according to claim 1, wherein in the step (2), reaction conditions for the first liquefaction reaction are as follows:
    a reaction temperature is 280° C. to 470° C.;
    a reaction pressure is 13 MPa to 27 MPa;
    a gas-liquid ratio is 600 L/kg to 1,400 L/kg; and
    a space velocity of the biomass slurry is 0.3/h to 2/h.

4. The method according to claim 1, wherein in the step (3), reaction conditions for the second liquefaction reaction are as follows:
    a reaction temperature is 300° C. to 490° C.;
    a reaction pressure is 12 MPa to 27 MPa;
    a gas-liquid ratio is 700 L/kg to 1,600 L/kg; and
    a space velocity of the biomass slurry is 0.3/h to 2/h.

5. The method according to claim 1, wherein in the step (4), the vacuum distillation is carried out at a temperature of 320° C. to 400° C. under a pressure of 5 kPa to 20 kPa.

6. The method according to claim 1, wherein in the step (7), the fractionation operation is carried out at a temperature of 340° C. to 390° C.

7. The method according to claim 1, further comprising a step of collecting a distillate oil obtained after the vacuum distillation step and a heavy fraction obtained after the fractionation operation step to use the distillate oil and the heavy fraction as the solvent oil.

8. The method according to claim 1, wherein before the hydrogenation product is subjected to fractionation operation, the hydrogenation product is subjected to a second separation operation to obtain hydrogen gas, a gas-phase light hydrocarbon and a liquid phase, wherein the hydrogen gas is circulated and used in the first liquefaction reaction, the second liquefaction reaction and the hydrogenation reaction.

9. The method according to claim 1, wherein in the step (1), the biomass slurry has a biomass content of 10 wt % to 50 wt % and a particle size of 5 to 2,000 microns; and
    the mixing is carried out at a temperature of 25° C. to 180° C.

10. The method according to claim 1, wherein the hydrogenation catalyst comprises at least one selected from a group consisting of the following catalysts:
    1) amorphous iron oxide and/or amorphous iron oxide hydroxide; and
    2) amorphous aluminum oxide loading an active component, wherein the active component comprises at least one selected from oxides of metals of group VIB, group VIIB and group VIII, and the active component has a content of 10 wt % to 25 wt % with respect to the mass of the hydrogenation catalyst; and
    the solvent oil comprises at least one selected from a group consisting of the distillate oil obtained after the vacuum distillation step, vegetable oil, animal oil, coal tar and discharged slurry oil of a catalytic cracking unit.

11. The method according to claim 2, wherein in the step (2), reaction conditions for the first liquefaction reaction are as follows:
    a reaction temperature is 280° C. to 470° C.;
    a reaction pressure is 13 MPa to 27 MPa;
    a gas-liquid ratio is 600 L/kg to 1,400 L/kg; and
    a space velocity of the biomass slurry is 0.3/h to 2/h.

12. The method according to claim 2, wherein in the step (3), reaction conditions for the second liquefaction reaction are as follows:
    a reaction temperature is 300° C. to 490° C.;
    a reaction pressure is 12 MPa to 27 MPa;
    a gas-liquid ratio is 700 L/kg to 1,600 L/kg; and
    a space velocity of the biomass slurry is 0.3/h to 2/h.

13. The method according to claim 2, wherein in the step (4), the vacuum distillation is carried out at a temperature of 320° C. to 400° C. under a pressure of 5 kPa to 20 kPa.

14. The method according to claim 2, wherein in the step (7), the fractionation operation is carried out at a temperature of 340° C. to 390° C.

15. The method according to claim 2, further comprising a step of collecting a distillate oil obtained after the vacuum distillation step and a heavy fraction obtained after the fractionation operation step to use the distillate oil and the heavy fraction as the solvent oil.

16. The method according to claim 2, wherein before the hydrogenation product is subjected to fractionation operation, the hydrogenation product is subjected to a second separation operation to obtain hydrogen gas, a gas-phase light hydrocarbon and a liquid phase, wherein the hydrogen gas is circulated and used in the first liquefaction reaction, the second liquefaction reaction and the hydrogenation reaction.

17. The method according to claim 2, wherein in the step (1), the biomass slurry has a biomass content of 10 wt % to 50 wt % and a particle size of 5 to 2,000 microns; and the mixing is carried out at a temperature of 25° C. to 180° C.

18. The method according to claim 2, wherein the hydrogenation catalyst comprises at least one selected from a group consisting of the following catalysts:
   1) amorphous iron oxide and/or amorphous iron oxide hydroxide; and
   2) amorphous aluminum oxide loading an active component, wherein the active component comprises at least one selected from oxides of metals of group VIB, group VIIB and group VIII, and the active component has a content of 10 wt % to 25 wt % with respect to the mass of the hydrogenation catalyst; and the solvent oil comprises at least one selected from a group consisting of the distillate oil obtained after the vacuum distillation step, vegetable oil, animal oil, coal tar and discharged slurry oil of a catalytic cracking unit.

* * * * *